(12) United States Patent
Lin

(10) Patent No.: US 8,047,127 B2
(45) Date of Patent: Nov. 1, 2011

(54) GROUND COFFEE EXTRACTION APPARATUS

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 426 days.

(21) Appl. No.: 12/420,876

(22) Filed: Apr. 9, 2009

(65) Prior Publication Data
US 2010/0258009 A1    Oct. 14, 2010

(51) Int. Cl.
*A47J 31/36* (2006.01)
*A47J 31/00* (2006.01)

(52) U.S. Cl. .................................. 99/302 P; 99/302 R
(58) Field of Classification Search ............... 99/302 P, 99/302 R, 297, 300
See application file for complete search history.

(56) References Cited

U.S. PATENT DOCUMENTS

| 5,103,716 A * | 4/1992 | Mikkelsen ................. 99/289 R |
| 6,711,988 B1 * | 3/2004 | Eugster ........................ 99/299 |
| 6,763,759 B2 * | 7/2004 | Denisart .................... 99/302 P |

* cited by examiner

*Primary Examiner* — Reginald L Alexander
(74) *Attorney, Agent, or Firm* — Alan Kamrath; Kamrath & Associates PA

(57) ABSTRACT

A ground coffee extraction apparatus has a base to which a filter cup loaded with ground coffee is assembled from below. A delivery system pumps cool water from a cool water tank into the extraction apparatus. The cool water exerts a downward force greater than a resilient force of resilient elements of the extraction apparatus to drive a sliding element and a downward pressing element downward. Consequently, an O-ring seals a gap between the downward pressing element and the filter cup while the downward force is evenly applied to the ground coffee in the filter cup, thereby sealing and compacting the ground coffee hydraulically. After coffee is extracted, the cool water is drawn back into the cool water tank so that the sliding element and the downward pressing element are moved upward to unseal the filter cup. Hence, the automatic extraction apparatus enables rapid, uniform, and standardized sealing and compacting.

3 Claims, 8 Drawing Sheets

GROUND COFFEE EXTRACTION APPARATUS

BACKGROUND OF THE INVENTION

1. Technical Field

The present invention relates to a ground coffee extraction apparatus which uses water pressure to seal a filter cup and compact coffee granules loaded therein so that coffee of consistent quality can be extracted through a convenient automatic operation.

2. Description of Related Art

Coffeemakers are well known in the art. Conventionally, ground coffee, which is prepared by grinding coffee beans into granules, is filled into a filter cup to be coupled with a coffeemaker, and is then manually compressed and flattened with a tamper to reduce the voids and air between the coffee granules, wherein operation of the tamper relies chiefly on the operator's sense of touch. Afterward, the filter cup is screwed onto the coffeemaker forcedly so as to secure the filter cup sealingly in place. When the coffeemaker is turned on, hot water drips onto and thereby infuses the ground coffee in the filter cup so that coffee is extracted. However, the aforesaid filter cup and tamper are difficult to use because the force by which to screw the filter cup in place and compact the ground coffee varies with operators, and in consequence the density of the compacted ground coffee tends to fluctuate. As a result, the coffee extracted tastes differently.

BRIEF SUMMARY OF THE INVENTION

In view of the above and realizing that the conventional way of sealing the filter cup and compacting with the tamper requires improvement, the inventor of the present invention exercised his professional knowledge accumulated through years of experience in design and manufacture and finally succeeded, through repeated trials with ingenious ideas, in developing an automatic ground coffee extraction apparatus as disclosed herein.

The primary objective of the present invention is to provide a ground coffee extraction apparatus, wherein a filter cup loaded with ground coffee is assembled to a base of the extraction apparatus from below, and a delivery system includes a pump that introduces cool water from a cool water tank into the extraction apparatus. The cool water exerts a downward force greater than a resilient force of resilient elements of the extraction apparatus, thereby driving a sliding element mounted around shafts to move downward along with a downward pressing element. Consequently, an O-ring of the downward pressing element seals a gap between the downward pressing element and the filter cup while the downward force is evenly applied to the loose ground coffee in the filter cup, thereby sealing and compacting the ground coffee hydraulically and automatically. After coffee is extracted, the delivery system draws the cool water from the extraction apparatus back into the cool water tank so that the sliding element is moved upward along with the downward pressing element to unseal the filter cup. Hence, the automatic extraction apparatus enables rapid, uniform, and standardized sealing and compacting operations.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein.

DETAILED DESCRIPTION OF THE INVENTION

Figure 1:
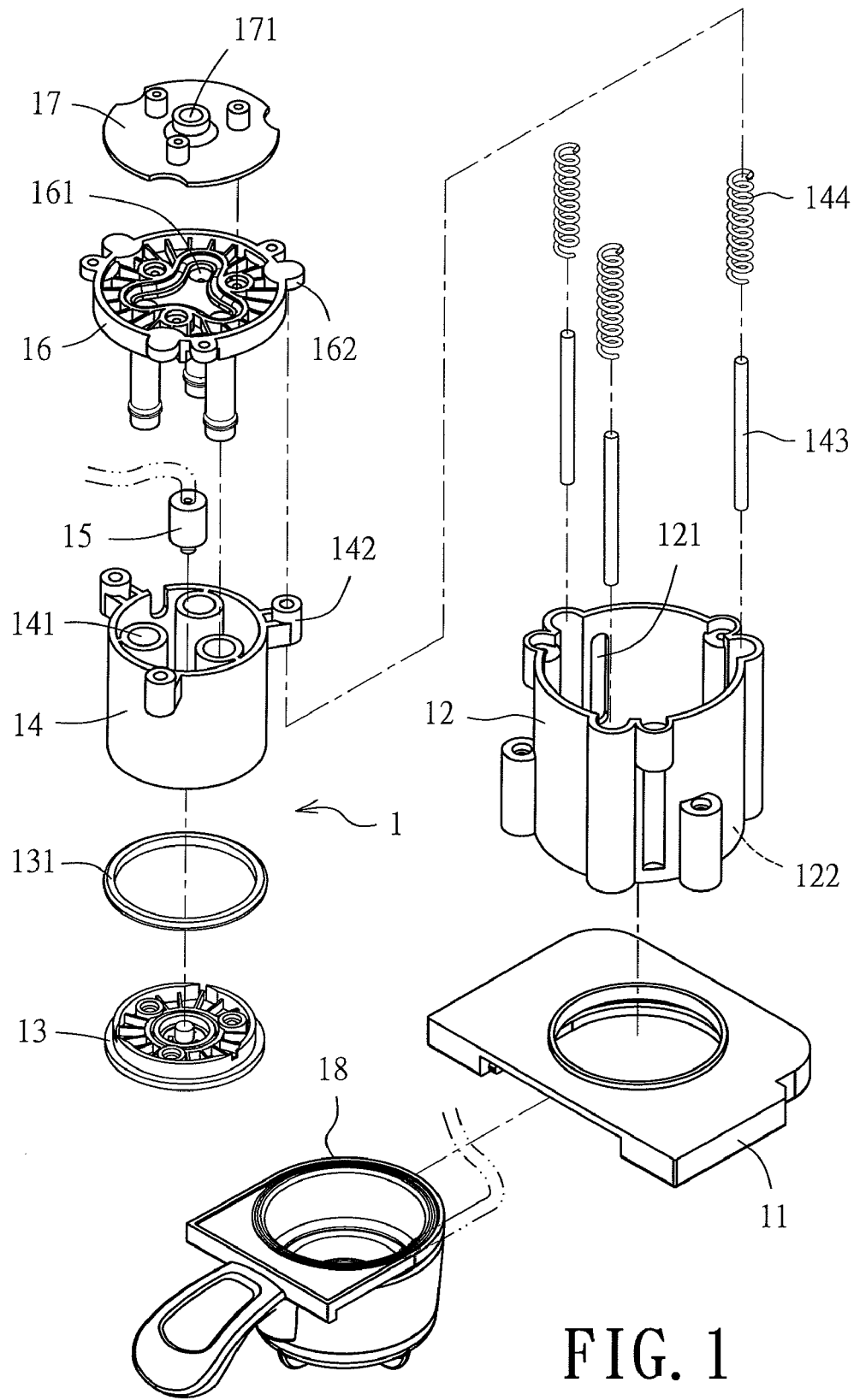
FIG. 1 is an exploded perspective view of an extraction apparatus according to the present invention.
Figure 2:
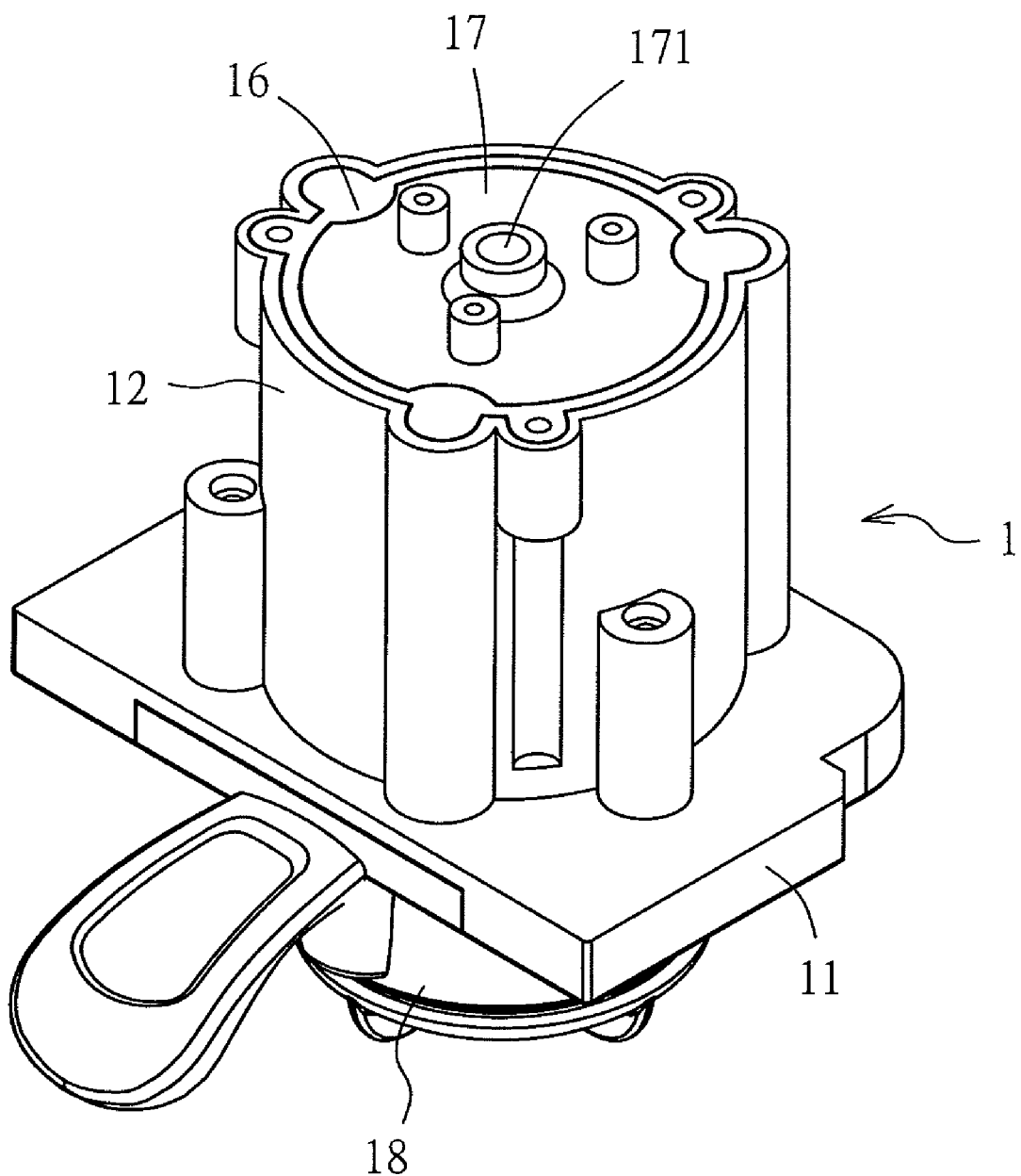
FIG. 2 is an assembled perspective view of the extraction apparatus according to the present invention.
Figure 3:
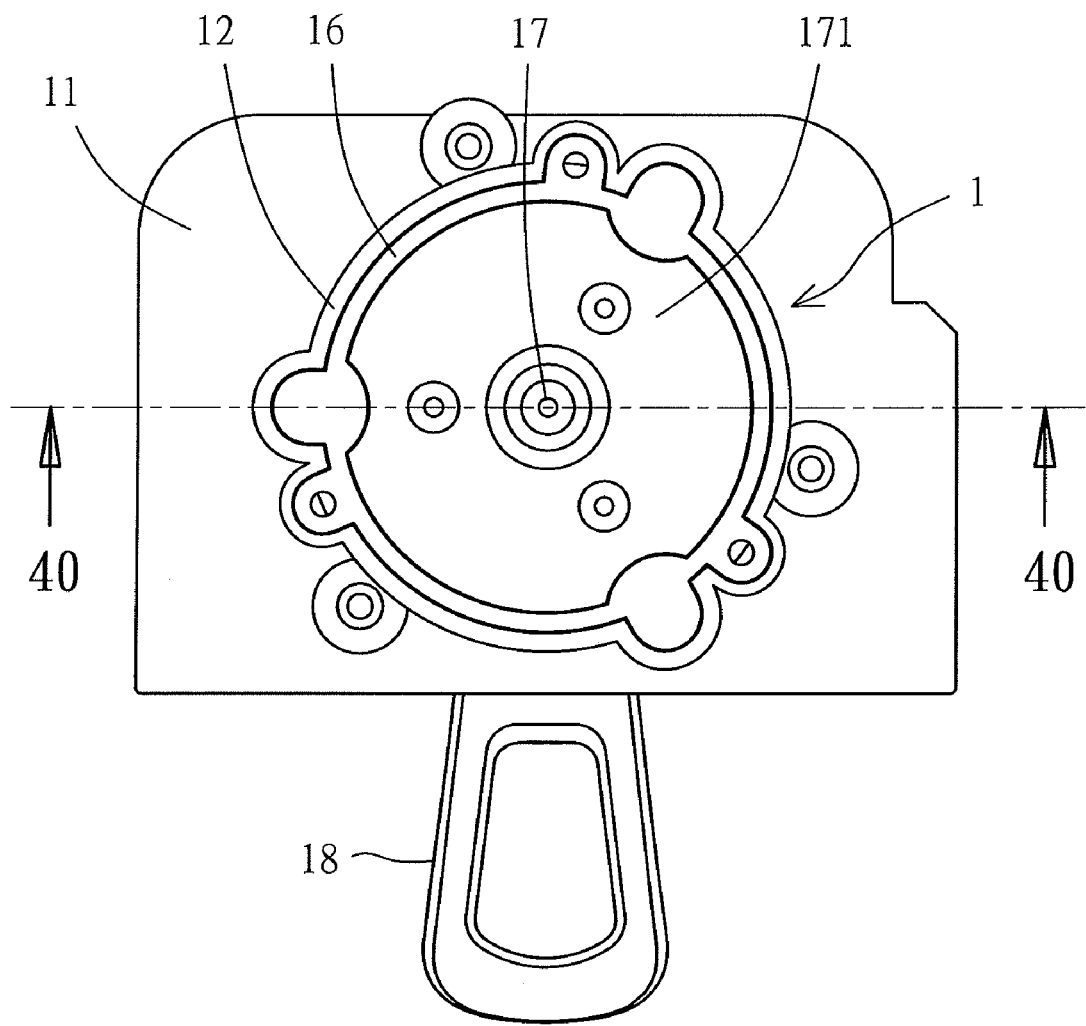
FIG. 3 is an assembled top view of the extraction apparatus according to the present invention.

Referring to FIGS. 1 through 4, a ground coffee extraction apparatus 1 according to the present invention is coupled with a delivery system 2 (see FIGS. 5 and 7) and configured as follows.

The extraction apparatus 1 includes a base 11 with which an outer annular body 12 having a slot 121 is coupled from above. The outer annular body 12 is installed therein sequentially with a downward pressing element 13, a sliding element 14 provided with a guide tube 15, and an upper cover 16. The downward pressing element 13 is peripherally provided with an O-ring 131. A lid 17 having a water inlet opening 171 is provided above the upper cover 16. The sliding element 14 is formed with a plurality of water receiving sections 141 and peripherally extended with a plurality of retaining portions 142. A resilient element 144 is provided below and adjacent to each of the retaining portions 142 of the sliding element 14. The outer annular body 12 and the upper cover 16 are formed interiorly with a plurality of engaging portions 122 and 162, respectively, wherein the engaging portions 122 and 162 correspond in position to the retaining portions 142 of the sliding element 14. The upper cover 16 is formed with a plurality of water inlet sections 161 corresponding in position to the water receiving sections 141 of the sliding element 14, respectively. A plurality of shafts 143 are engaged with and between the engaging portions 122 of the outer annular body 12 and the engaging portions 162 of the upper cover 16, respectively. The shafts 143 also pass through the retaining portions 142 of the sliding element 14, respectively, while the resilient elements 144 are each mounted around a corresponding one of the shafts 143. Besides, the delivery system 2 is coupled to one side of the extraction apparatus 1.

Figure 4:
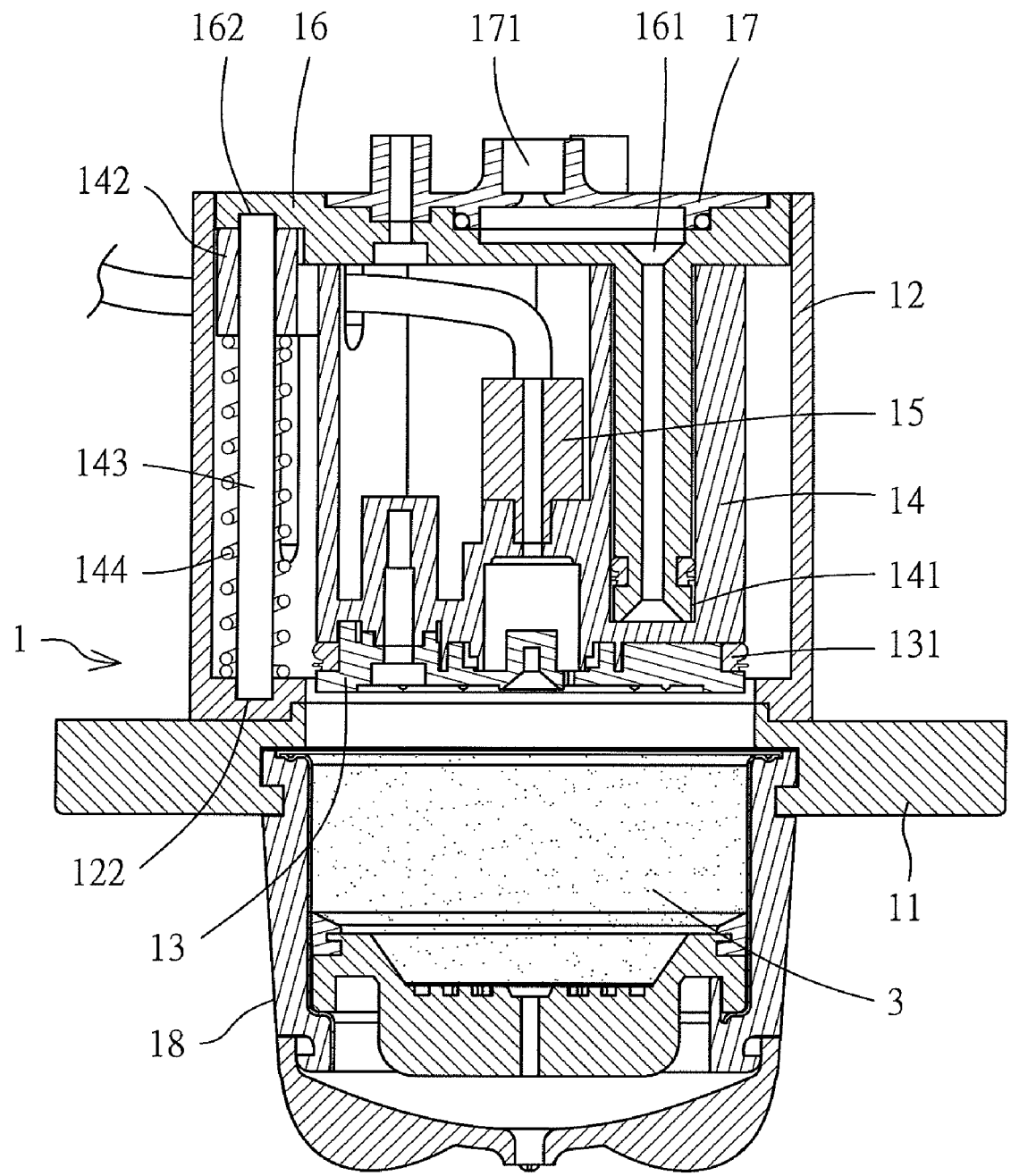
FIG. 4 is a detailed sectional view taken along line 40-40 in FIG. 3.
Figure 5:
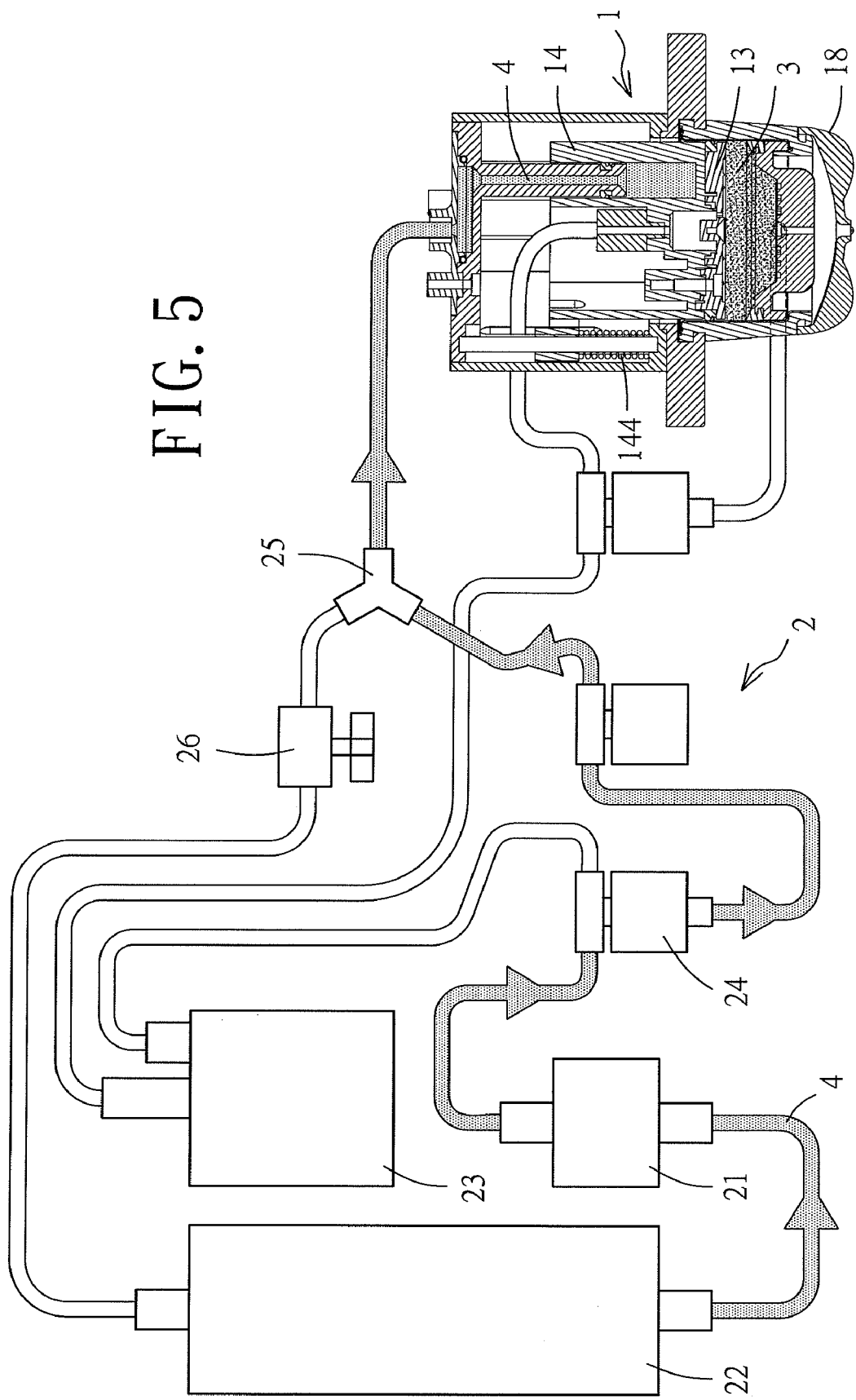
FIG. 5 is a schematic drawing showing inward cool water delivery by a delivery system according to the present invention.
Figure 6:
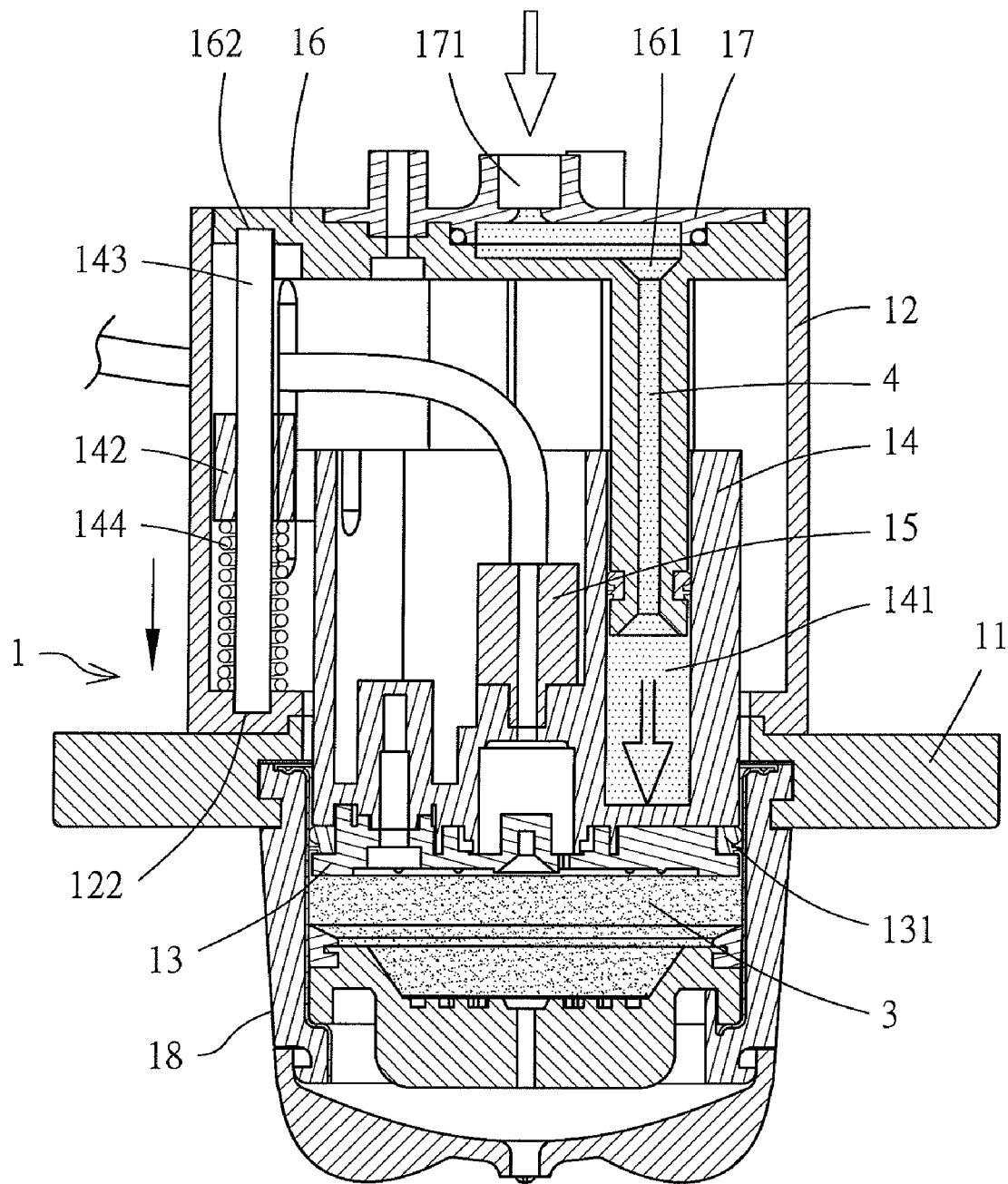
FIG. 6 illustrates a downward action of the extraction apparatus according to the present invention.

The extraction apparatus 1 operates in the following manner. To begin with, a fixed amount of ground coffee 3 is loaded into a filter cup 18, as shown in FIG. 4. Then, a pump 21 in the delivery system 2 draws cool water 4 from a cool water tank 22. The cool water 4 flows through a three-way solenoid valve 24 and enters a heating tank 23 so as to be heated for later use. Subsequently, the three-way solenoid valve 24 is switched to guide the cool water 4 through a three-way pipe 25 so that the cool water 4 passes through the water inlet opening 171 on the lid 17 of the extraction apparatus 1 and flows into the water inlet sections 161 of the upper cover 16 and the water receiving sections 141 of the sliding element 14, as shown in FIGS.

5 and 6. The incoming cool water 4 accumulates and therefore exerts a downward force that gradually increases and finally exceeds a resilient force of the resilient elements 144, thereby driving the sliding element 14 mounted around the shafts 143 to move downward along with the downward pressing element 13. As a result, the downward force is applied evenly to and thereby compacts the loose ground coffee 3 in the filter cup 18. Meanwhile, the O-ring 131 of the downward pressing element 13 seals a gap between the downward pressing element 13 and the filter cup 18 to prevent the ground coffee 3 from leaking through the gap while being compacted, thus achieving a sealing effect.

Figure 7:
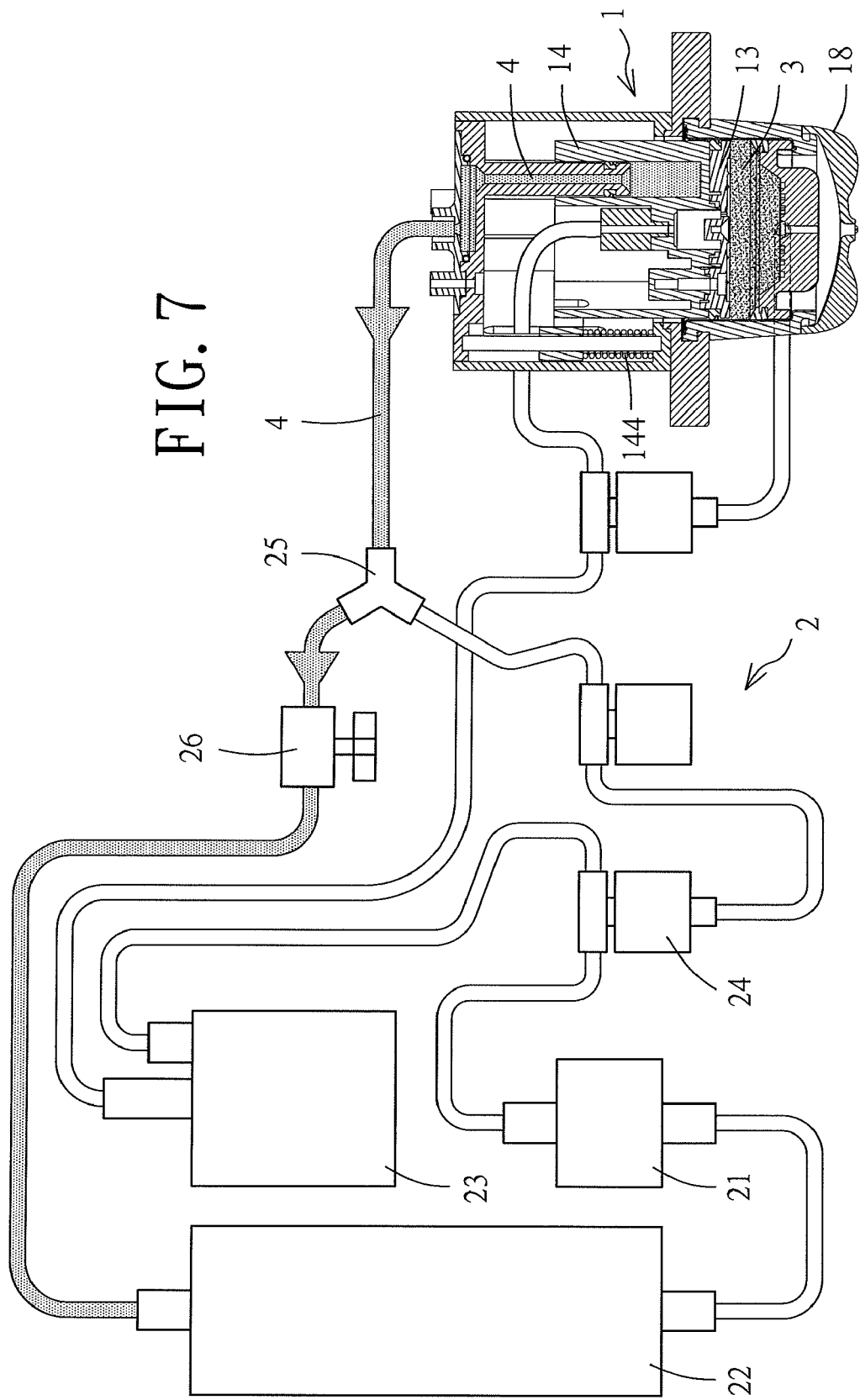
FIG. 7 is a schematic drawing showing outward cool water delivery by the delivery system according to the present invention.
Figure 8:
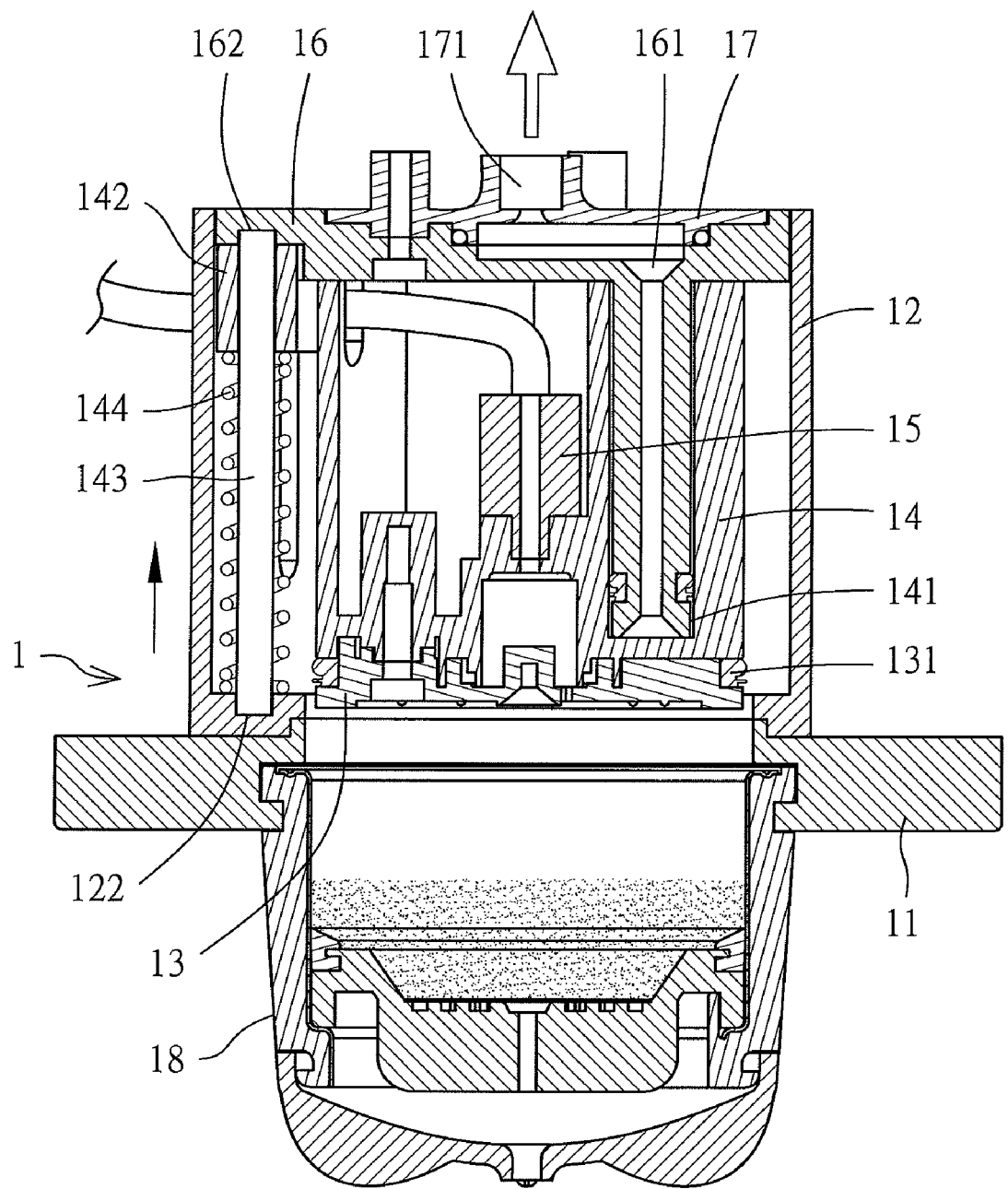
FIG. 8 illustrates a restoring action of the extraction apparatus according to the present invention.

After coffee is extracted from the compacted ground coffee 3, the pump 21 of the delivery system 2 stops pumping the cool water 4, and a pressure relief solenoid valve 26 is actuated so that the resilient force of the resilient elements 144 pushes the cool water 4 outward back into the cool water tank 22, as shown in FIG. 7. While the cool water 4 is being discharged, the sliding element 14 mounted around the shafts 143 is gradually moved upward along with the downward pressing element 13 until the sliding element 14 and the downward pressing element 13 resume their original positions, as shown in FIG. 8, thereby unsealing the filter cup 18. As soon as the aforesaid operation is completed, the filter cup 18 can be detached from the base 11 so as to remove the coffee ground in the filter cup 18.

The invention claimed is:

1. A ground coffee extraction apparatus, comprising a base coupled with an outer annular body from above, wherein the outer annular body is installed sequentially therein with a downward pressing element, a sliding element, and an upper cover, the downward pressing element being peripherally provided with an O-ring, the sliding element being formed with a plurality of water receiving sections and a plurality of retaining portions, the upper cover being formed with a plurality of water inlet sections and a plurality of engaging portions corresponding in position to the water receiving sections and the retaining portions of the sliding element, respectively, a resilient element being provided below and adjacent to each said retaining portion of the sliding element, a delivery system being coupled to a side of the extraction apparatus;

wherein a fixed amount of ground coffee is loaded into a filter cup, and a pump in the delivery system draws cool water from a cool water tank into the water inlet sections of the upper cover of the extraction apparatus so that the cool water exerts a downward force greater than a resilient force of the resilient elements, thus enabling the O-ring of the downward pressing element to seal a gap between the downward pressing element and the filter cup while the downward force is applied evenly to the loose ground coffee in the filter cup, thereby sealing and compacting the ground coffee hydraulically and automatically; and wherein after coffee is extracted, the delivery system guides the cool water from the extraction apparatus back into the cool water tank, and consequently the sliding element and the downward pressing element are moved upward to original positions thereof to unseal the filter cup, whereby the automatic extraction apparatus performs the sealing and the compacting rapidly and uniformly.

2. The ground coffee extraction apparatus of claim 1, wherein the upper cover is provided thereabove with a lid having a water inlet opening.

3. The ground coffee extraction apparatus of claim 1, wherein each of the outer annular body and the upper cover is formed interiorly with a plurality of engaging portions, and a plurality of shafts are engaged with and between the engaging portions of the outer annular body and the engaging portions of the upper cover, respectively, each said shaft passing through a corresponding said retaining portion of the sliding element so that each said shaft is mounted therearound with a corresponding said resilient element.

* * * * *